(12) United States Patent
Ho et al.

(10) Patent No.: US 9,472,161 B1
(45) Date of Patent: Oct. 18, 2016

(54) CUSTOMIZING VIRTUAL ASSETS

(75) Inventors: David Ho, Torrance, CA (US); Dennis Suggs, Chino Hills, CA (US)

(73) Assignee: CIE Games LLC, San Francisco, CA (US)

( * ) Notice: Subject to any disclaimer, the term of this patent is extended or adjusted under 35 U.S.C. 154(b) by 15 days.

(21) Appl. No.: 13/308,399

(22) Filed: Nov. 30, 2011

Related U.S. Application Data

(60) Provisional application No. 61/458,844, filed on Dec. 1, 2010.

(51) Int. Cl.
    G09G 5/02      (2006.01)
    G06T 11/00     (2006.01)
    H04N 1/60      (2006.01)

(52) U.S. Cl.
    CPC ............... *G09G 5/02* (2013.01); *G06T 11/001* (2013.01); *G09G 5/026* (2013.01); *H04N 1/60* (2013.01); *H04N 1/6058* (2013.01)

(58) Field of Classification Search
    CPC ..... G06T 11/001; G06T 15/04; G06T 19/02; G06F 9/4443; G09G 5/02; G09G 5/06
    USPC ........................................ 345/589, 581, 593
    See application file for complete search history.

(56) References Cited

U.S. PATENT DOCUMENTS

| | | | |
|---|---|---|---|
| 7,106,343 B1 * | 9/2006 | Hickman | 345/589 |
| 7,558,433 B1 * | 7/2009 | Georgiev | 382/254 |
| 2006/0213975 A1 | 9/2006 | Krishnan et al. | |
| 2006/0228020 A1 * | 10/2006 | Sakai | 382/162 |
| 2007/0239521 A1 | 10/2007 | Khadpe et al. | |
| 2008/0120265 A1 | 5/2008 | Falardeau et al. | |
| 2009/0106672 A1 | 4/2009 | Burstrom | |
| 2009/0222348 A1 | 9/2009 | Ransom et al. | |
| 2010/0177109 A1 * | 7/2010 | Moore et al. | 345/589 |
| 2010/0318407 A1 | 12/2010 | Leff et al. | |
| 2011/0010270 A1 | 1/2011 | Hamilton, II et al. | |

OTHER PUBLICATIONS

Wheelock, Asa M., and Alan R. Buckpitt. "Software-induced variance in two-dimensional gel electrophoresis image analysis." Electrophoresis 26.23 (2005): 4508-4520.*

Paul Taylor, "Atomic Guide—Shading and Highlights", Dec. 14, 2007, Copyright Tadpole Webworks, http://www.tadpolewebworks.com/web/atomic/highlights.html.*

Gimp, "2. Layer Modes", Sep. 16, 2006, GIMP, http://docs.gimp.org/en/gimp-concepts-layer-modes.html.*

(Continued)

*Primary Examiner* — Mark Zimmerman
*Assistant Examiner* — Sarah Le
(74) *Attorney, Agent, or Firm* — Morgan, Lewis & Bockius LLP

(57) ABSTRACT

Customizing virtual assets is disclosed, including: transforming each of a plurality of initially identical copies of a virtual asset or a portion thereof to isolate a feature of the virtual asset or portion thereof; and enabling the isolated feature to be changed by a user in at least one of the transformed copies. In some embodiments, customizing virtual assets includes: receiving a three-dimensional model associated with the virtual asset; receiving an indication to save a two-dimensional virtual asset based on the 3D model with a 2D image wrapped on it; and using the 3D model with the 2D image wrapped on it to generate the 2D virtual asset.

23 Claims, 17 Drawing Sheets
(10 of 17 Drawing Sheet(s) Filed in Color)

(56) References Cited

OTHER PUBLICATIONS

Corey, "Ambient Occlusion", May 17, 2009, Original Artwork by Corey © Copy right of Last of the Dragons Inc. 2009, http://www.coreyloving.com/Gallery/Tutorials/AmbientOcclusion.html.*

Sothink, "Version History of Sothink SWF Decompiler", Jun. 16 2006, Sothink.com, http://www.sothink.com/product/flashdecompiler/whatsnew.htm.*

Neil Vidyarthi, "Bing Advertises on Farmville, Acquires 400,000 Facebook Fans in One Day", Mar. 4, 2010. http://www.allfacebook.com/bing-advertises-on-farmville-acquires-400000-facebook-fans-in-one-day-2010-03.

* cited by examiner

CUSTOMIZING VIRTUAL ASSETS

CROSS REFERENCE TO OTHER APPLICATIONS

This application claims priority to U.S. Provisional Patent Application No. 61/458,844 entitled COLORIZING VIRTUAL GOODS IN FLASH CLIENT filed Dec. 1, 2010 which is incorporated herein by reference for all purposes.

BACKGROUND OF THE INVENTION

Interactive computer gaming is an expanding industry. With the increasing prevalence of networked devices and social media, online interactive gaming has also become convenient and popular. In the realm of online gaming, users can interact with one another via virtual identities and also virtual assets. As users spend more time engaging with virtual assets, it would be desirable to allow users to customize virtual assets to suit their interests and aesthetic tastes, for example.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Customizing a virtual asset is disclosed. In some embodiments, the color associated with a virtual asset can be customized by allowing a user to select a base color associated with the asset. In some embodiments, a graphic design can be applied to an asset by first wrapping a two-dimensional, user-chosen image over a three-dimensional model of the asset. In some embodiments, one or more two-dimensional images associated with the asset are then generated from the model wrapped with the user-chosen image.

Figure 1:
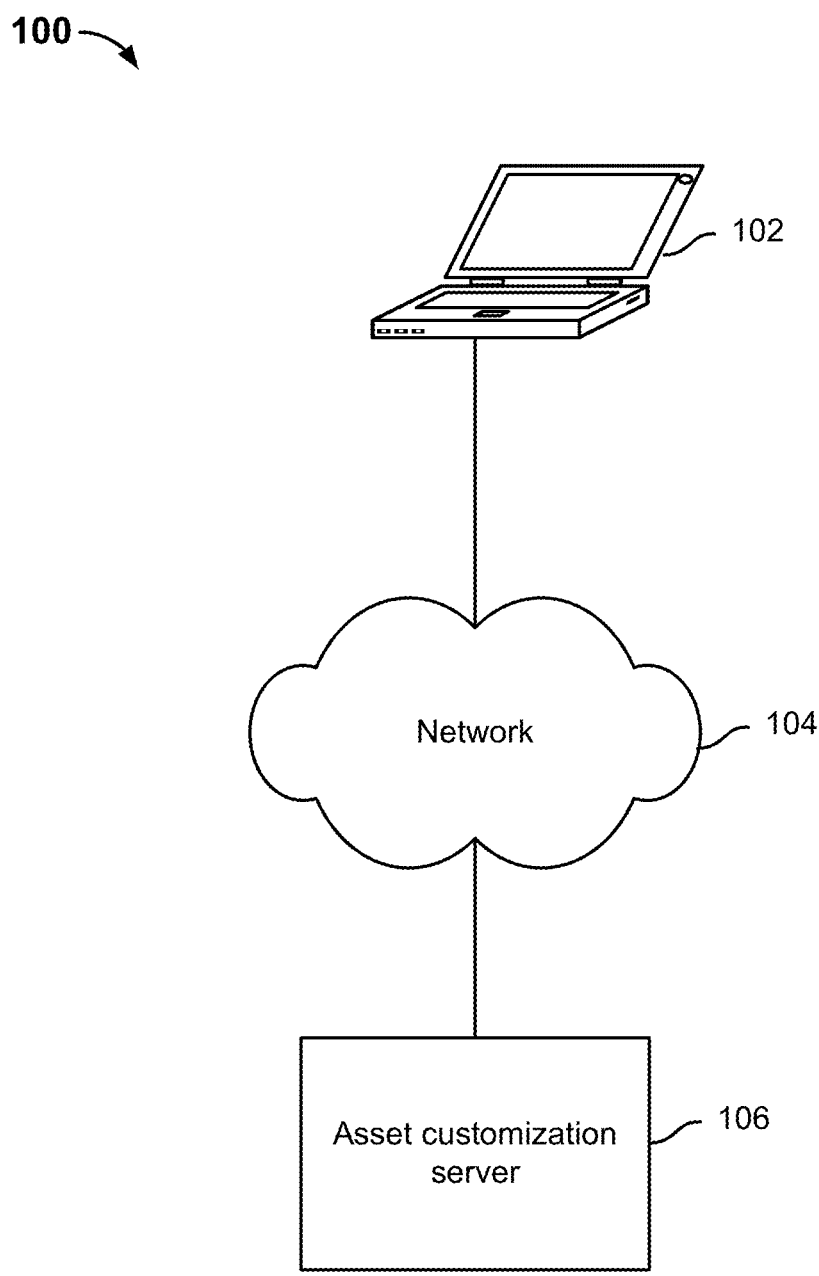
FIG. 1 is a diagram showing an embodiment of a system for performing asset customization.

FIG. 1 is a diagram showing an embodiment of a system for performing asset customization. In the example, system 100 includes device 102, network 104, and asset customization server 106. Network 104 includes high-speed data and/or telecommunications networks.

Device 102 is configured to access asset customization server 106 via network 104. For example, device 102 can be a laptop computer, a desktop computer, a tablet device, a smart phone, a mobile device, or any other computing device. In various embodiments, a web browser and/or software application and/or environment is installed at device 102 to enable device 102 to engage in an interactive online game hosted by asset customization server 106. For example, a Flash Client can be installed at device 102. For example, a user can use device 102 to access the game via a web browser by accessing the appropriate uniform resource locator (URL) and/or performing authentication (e.g., associated with an account that the user has with the game). In some embodiments, a user who wishes to access the game needs to first access a third-party application/website (e.g., Facebook®) prior to logging into the game. In some embodiments, device 102 includes an application and/or logic to communicate with asset customization server 106 to send and/or receive data files associated with the game hosted by asset customization server 106. In some embodiments, data files related to the game hosted by asset customization server 106 can be stored on one or both of device 102 or asset customization server 106.

In some embodiments, asset customization server 106 is configured to host a game over network 104 and also to communicate with device 102. Asset customization server 106 sends data and/or logic to device 102 to enable a user at device 102 to customize a color associated with an asset. Asset customization server 106 sends data associated with an asset to device 102. Device 102 transforms the asset into multiple copies and processes each copy independently to isolate a particular feature associated with the original asset in an image layer. In some embodiments, at least one of the copies is processed to include a solid color, which can be changed to any one color that is available. Then, the layers are combined to form an asset with, for example, a base color different than the color of the original asset.

In some embodiments, asset customization server 106 is configured to send data and/or logic to device 102 to enable a user at device 102 to customize an asset by applying a 2D graphic design to it. The asset is represented in game play by one or more 2D images (as such, herein, the asset is sometimes referred to as a 2D asset), where each 2D image of the asset shows a different angle/perspective of the 3D asset. However, each 2D image of the asset is rendered to give a 3D-like appearance (e.g., the image includes the appearance of highlights and shadows that show depth and dimension) of the asset at that particular angle/perspective. To generate a 3D-appearing 2D image of the asset with the desired graphic design applied to it, in some embodiments, a 3D model of the asset is used to model the 3D appearance of the asset with the desired graphic design wrapped around it.

Colorizing Virtual Assets

Figure 2:
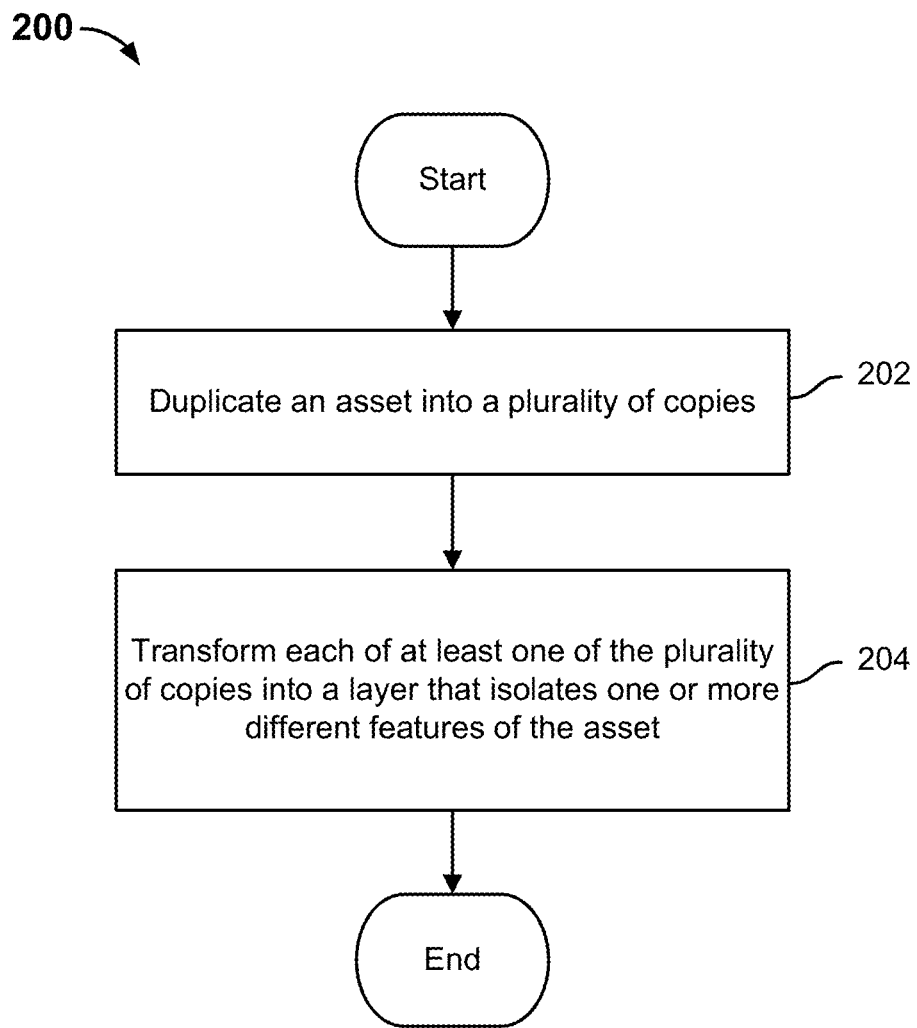
FIG. 2 is a flow diagram showing an embodiment of a process for customizing the color of an asset.

FIG. 2 is a flow diagram showing an embodiment of a process for customizing the color of an asset. In some embodiments, process 200 is implemented at system 100. For example, process 200 can be implemented at device 102 of system 100.

At 202, an asset is duplicated into a plurality of copies. For example, an asset can be an Adobe Flash SWF file that comprises one or more layers of bitmap data. In some embodiments, the virtual asset is used, played with, or otherwise animated in a virtual gaming environment. The asset may be created based on an original artwork created by a digital artist using authoring software or some other tool. At least one of the layers of bitmap data is marked for coloring (the colorable layer). For example, in the SWF file of the asset, the colorable layer includes shading, highlight, and base color information. In some embodiments, the layer that is marked for coloring is initially colored a neutral red color. The asset is sent from a server, such as asset customization server 106, to the client (e.g., device 102) and if appropriate, the asset is loaded in an associated environment. For example, the server can send an asset that is an SWF file to the client device and then the SWF file can be loaded into a Flash Client installed at the client device. The asset (or the colorable layer thereof) is duplicated (e.g., using the Flash API) to generate multiple layers that are initially identical to one another.

At 204, each of at least one of the plurality of copies is transformed into a layer that isolates one or more different features of the asset. For example, a virtual car may be duplicated to generate three copies; the first copy can be associated with a base color of the car, the second copy can be associated with shading of the car, and the third copy can be associated with highlights of the car. For example, each copy can be processed differently from the other copies using a known image processing technique. For example, each duplicate of the colorable layer of the SWF file of the asset can be processed to isolate one of the shading, highlight, and base color features of the asset. In some embodiments, the color associated with the base color layer can be changed, as discussed further below.

Figure 3:
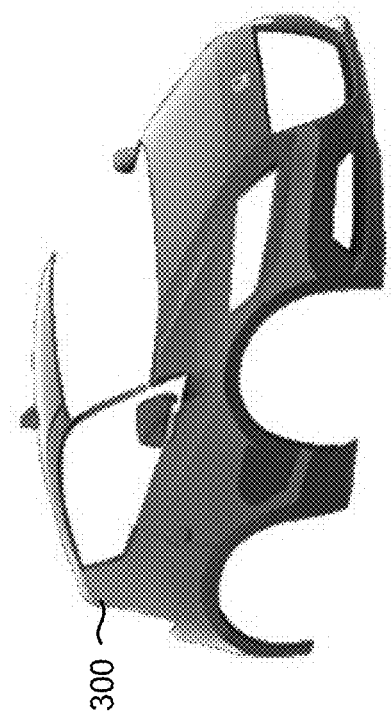
FIG. 3 is an example of an asset.

FIG. 3 is an example of an asset. In this example, the virtual asset 300 comprises a body portion of a virtual car. In some embodiments, data (e.g., a SWF file) that represents a virtual car asset such as virtual car asset 300 is transmitted from a server such as asset customization server 106 to a client device such as device 102. While virtual car asset 300 is a SWF file as discussed in this example, virtual car asset 300 can be represented by other file types as well.

In some embodiments, virtual car asset 300 is a 2D virtual good asset that is rendered to appear 3D. In some embodiments, the 2D image shown in FIG. 3 is one of many possible angles/perspectives of the virtual car asset 300 and each angle/perspective can be represented by a different 2D image. Although, for illustrative purposes, only the angle/perspective of virtual good asset 300 as seen in FIG. 3 is used in subsequent examples.

Figure 4:
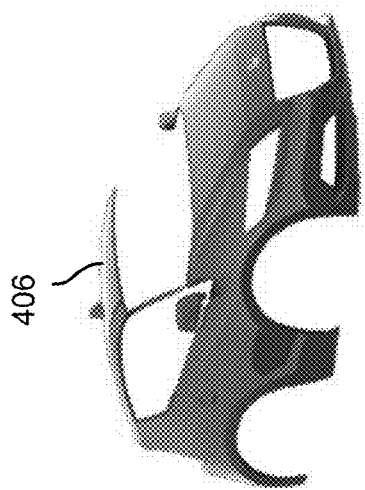
FIG. 4 is an example of three copies of virtual car asset 300.
Figure 4:
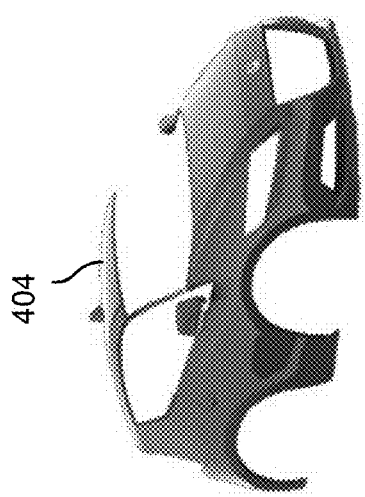
Figure 4:
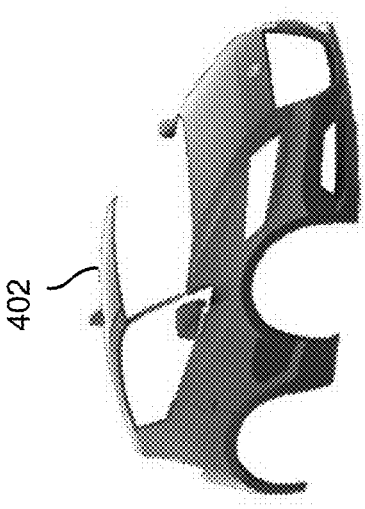

FIG. 4 is an example of three copies of virtual car asset 300. In the example, virtual car asset 300 was duplicated into three identical copies, 402, 404, and 406. In the example of virtual car asset 300 being represented by a SWF file, only the colorable layer of the SWF file (as opposed to the entire SWF file) is duplicated into copies 402, 404, and 406. While virtual car asset 300 is duplicated into three copies in the example, virtual car asset 300 can be duplicated into more or fewer copies. In some embodiments, virtual car asset 300 can be represented by a file type other than a SWF file and can be duplicated in any manner appropriate. In some embodiments, virtual car asset 300 can be duplicated into one or more copies at the client device. As will be discussed below, each copy will be transformed to isolate a particular feature of the visual appearance of virtual car asset 300.

Figure 5:
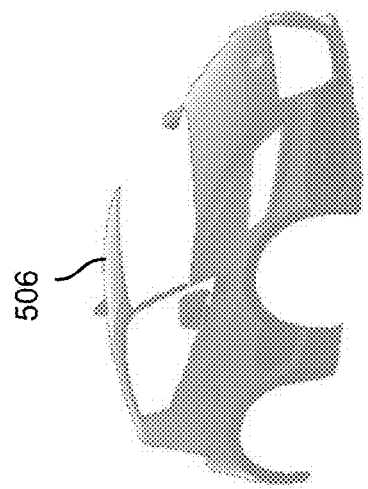
FIG. 5 is a diagram showing an example of three copies of virtual car asset 300, each transformed into a particular layer.
Figure 5:
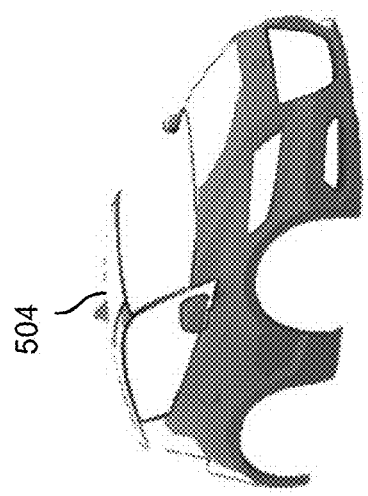
Figure 5:
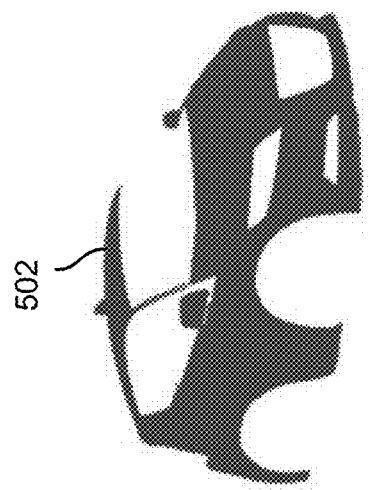

FIG. 5 is a diagram showing an example of three copies of virtual car asset 300, each transformed into a particular layer. In some embodiments, each duplicated copy of virtual car asset 300 (e.g., 402, 404, and 406 of FIG. 4) is transformed into a layer of image data that isolates a particular feature of the visual appearance of virtual car asset 300. For example, if virtual car asset 300 were represented by a SWF file, then the SWF file could be loaded into the Flash Client at the client device and, using the Flash application programming interface (API), each duplicated colorable layer copy is transformed using client-side bitmap processing. In the example of FIG. 5, a first duplicated copy is transformed into base color layer 502, a second duplicated copy is transformed into shading layer 504, and a third duplicated copy is transformed into highlight layer 506.

In some embodiments, base color layer 502 is filled in solid with a desired color. Alternatively, the same result can be achieved by first creating a bitmap completely filled with the desired color (i.e., a solid rectangle), then duplicating the alpha channel from the source bitmap. In various embodiments, the desired color used to fill base color layer 502 is selected by a user. In some embodiments, shading layer 504 is processed into a multiply layer consisting of only the dark portions of the original asset. This is done in some embodiments by adjusting the hue of the red component to maximum lightness (e.g., via Flash's ColorMatrixFilter), then changing the layer mode to "multiply." In some embodiments, highlight layer 506 is processed into a screen layer consisting of only the light portions of the original asset. This is done in some embodiments by adjusting the hue of the red component to minimum lightness (e.g., via Flash's ColorMatrixFilter), then changing the layer mode to "screen."

Figure 6:
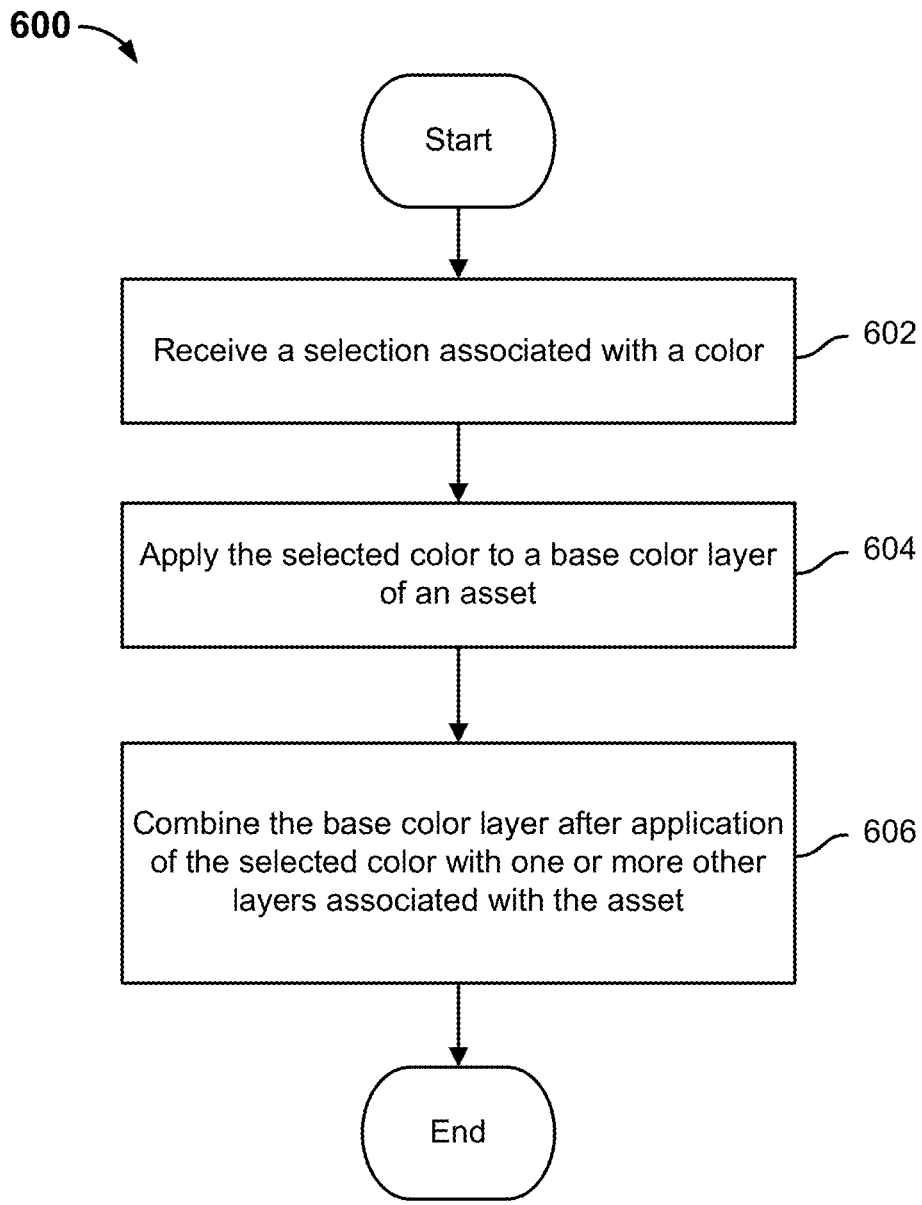
FIG. 6 is a flow diagram showing an embodiment of a process for customizing a base color of an asset.

FIG. 6 is a flow diagram showing an embodiment of a process for customizing a base color of an asset. In some embodiments, process 600 can be implemented at system 100.

At 602, a selection associated with a color is received. In some embodiments, the color of the base color layer such as base color layer 502 of an asset can be selected to be one that is desired by a user. In some embodiments, the desired color can be selected by a user at a user interface. For example, the user interface can be associated with an interactive (e.g., online) game hosted by a server such as asset customization server 106. Also, for example, the user interface can be available at a particular URL over a web browser. The user interface can, for example, be a color palette and/or lightness to darkness scale.

At 604, the selected color is applied to a base color layer of an asset. In some embodiments, the base color layer is filled in solid with the color selected at 602.

At 606, the base color layer after application of the selected color is combined with one or more other layers associated with the asset. In some embodiments, the base color layer now filled with the selected color is combined with other layers associated with the asset. In some embodiments, the base color layer is combined with other layers in a stack of layers. For example, returning to the example of FIG. 5, once base color layer 502 is filled with the selected color, it is stacked with shading layer 504 and highlight layer 506. For example, the layers can be stacked from bottom up in the following order: base color layer, shading layer, and highlight layer. In another example, the layers can be stacked from bottom up in the following order: base color layer, highlight layer, and shading layer. The combined effect is intended to recreate the original asset, but with the flexibility of setting the base color as any color desired by a user. For example, the processed and combined layers of virtual car asset 300 can resemble original virtual car asset 300 again, only with the base color changed to the color selected by a user.

Figure 7:
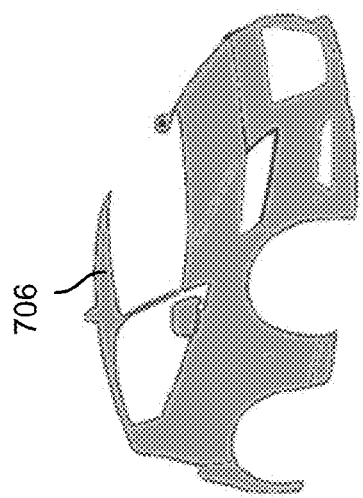
FIG. 7 is a diagram showing an example of a base color layer filled in with three different possible colors.
Figure 7:
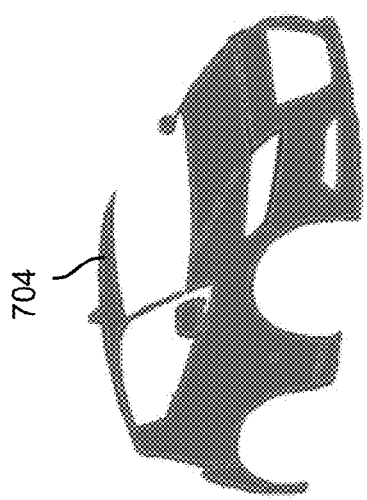
Figure 7:
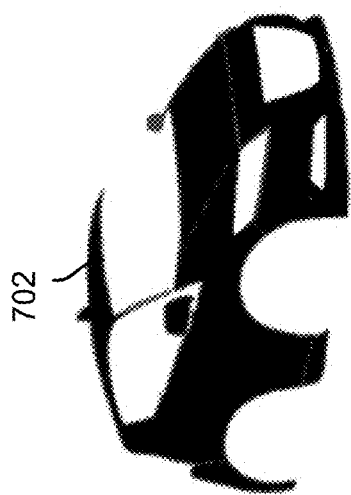

FIG. 7 is a diagram showing an example of a base color layer filled in with three different possible colors. As mentioned above, a user can select to fill in a base color layer such as base color layer 502 of an asset with a desired color. The example of FIG. 7 shows that a color desired by a user can be filled in solid in the base layer. In the example, each of 702, 704, and 706 is a different possible color with which a user may select to fill in the base color layer.

Figure 8:
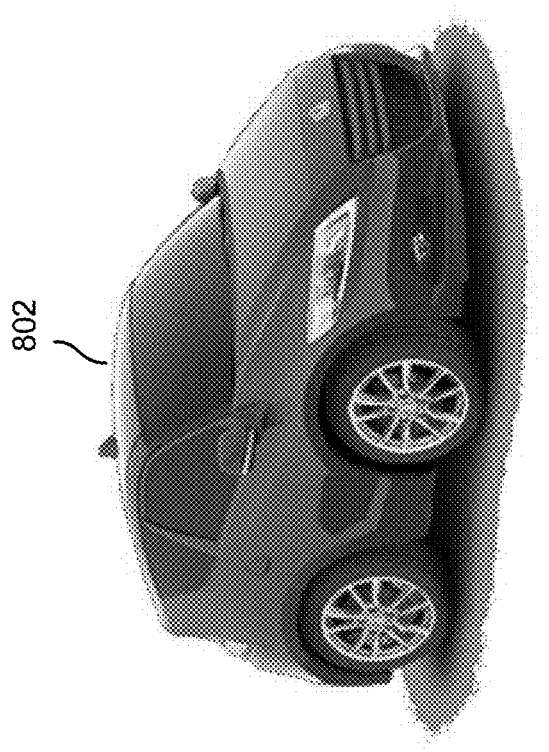
FIG. 8 is a diagram showing an example of a final virtual car asset including the base color, shading, and highlight layers combined with other layers.

FIG. 8 is a diagram showing an example of a final virtual car asset including the base color, shading, and highlight layers combined with other layers. In some embodiments, other layers are stacked above and below the base color, shading, and highlight layers. In the example, virtual car asset 802 represents the stacking of the base color, shading, and highlight layers, in addition to uncolored layers that represent the windows, wheels, rims, grille, and head/tail lights of the virtual car asset.

Customizing a Graphic Design for an Asset Using a 3D Model

Returning to FIG. 1, in some embodiments, asset customization server 106 sends data associated with a three-dimensional (3D) model (modeled after an asset created, for example, using a 3D authoring tool) to be run at device 102, associated code, and/or logic for interaction with a third party (e.g., 3D engine service). Then at device 102, a user can choose and/or generate a two-dimensional (2D) image to be wrapped on the 3D model. For example, the image can be chosen from a provided selection, or from the user's personal collection of images, which for example can be selected from the user's image or photo library and uploaded or emailed to asset customization server 106. In some embodiments, a user interface is provided to enable the user to change the placement of the selected 2D image as wrapped over the 3D model. For example, a 2D template associated with the 3D model, such as a 2D projection of elements comprising the 3D model, is displayed in some embodiments, and the user interface enables the user to position the 2D image as desired over the template, resulting in the 2D image being wrapped on the 3D model based on the user's placement of the image relative to the template. A third-party 3D engine is used in some embodiments to dynamically render a wrap of the chosen 2D image around the appropriate surfaces of the 3D model. The dynamically rendered wrapping over the 3D model can be displayed. In response to a certain condition being met (e.g., the performance of a specific user selection with respect to the user interface), the placement of the selected 2D image over the 3D model is frozen and one or more 2D images (e.g., each associated with a different angle of the 3D model) of the chosen image wrapped over the 3D model are generated. The generated 2D images are stored (e.g., at either or both of device 102 and asset customization server 106) and an appropriate generated 2D image associated with a particular angle/perspective of the asset can be displayed for the 2D asset at instances of the game play that are associated with that particular angle/perspective. In some embodiments, generating and storing the 2D assets enables the game to be played with the visual sense of a 3D asset being used in the game environment without requiring that the 3D model be retained on the user device and/or run during game play time. In some alternative embodiments, the 3D model with the user-chosen image wrapped over it is rendered and stored as a 3D model that incorporates the image as mapped to appropriate locations of its surface, and this generated 3D model is used in game play.

Figure 9:
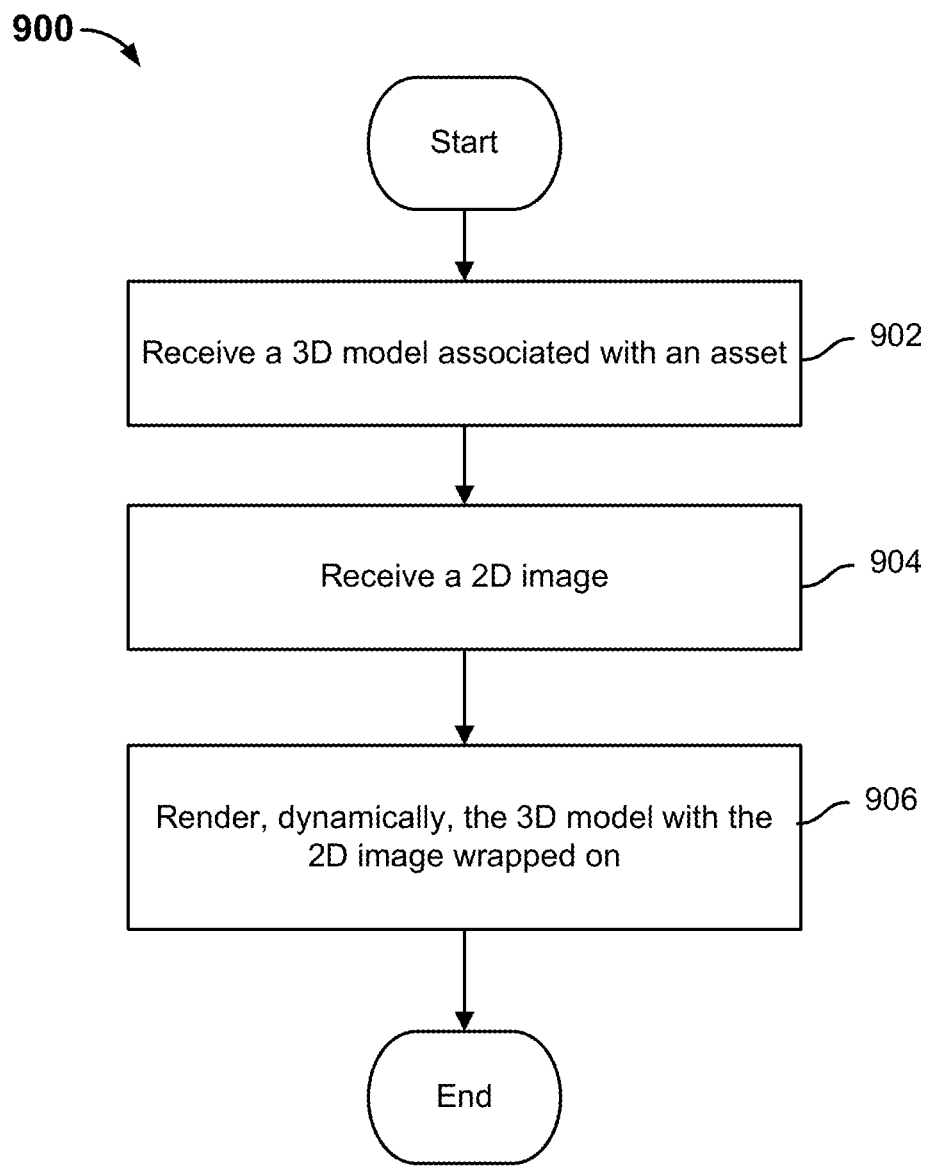
FIG. 9 is a flow diagram showing an embodiment of a process for customizing a graphic design for an asset.

FIG. 9 is a flow diagram showing an embodiment of a process for customizing a graphic design for an asset. In some embodiments, process 900 is implemented at system 100.

At 902, a 3D model associated with an asset is received. In some embodiments, the 3D model is associated with the body of a virtual car asset such as virtual car asset 300 of FIG. 3. In some embodiments, the virtual car asset associated with the 3D model is first created using a 3D digital content creation tool. Then, the content creation tool or another tool is used to generate the 3D model based on the original 3D digital artwork.

In some embodiments, the 3D model is sent from a server such as asset customization server 106 to a client device such as device 102. In some embodiments, the 3D model is a lightweight model with a relatively low polygon count, which can enable faster processing at the client device (as opposed to a model with a higher polygon count). For example, a 3D model (e.g., in Collada format) associated with the asset is received at the client device and imported into the Flash Client. In some embodiments, subsequent to receiving the 3D model, the 3D model is actively run by a third-party 3D engine (e.g., Away3D) at the client.

In some embodiments, an online interactive game hosted by the server is currently being accessed at the client device (e.g., via web browser) and the 3D model is sent to the client in association with the game. For example, the 3D model can be sent from the server to the client subsequent to a user-based selection to create a texture map for a virtual car asset in the game. Applications and/or programming code associated with the game can enable the 3D model to be loaded into the appropriate environment (e.g., Flash Client) and/or be supported by the appropriate rendering engine (e.g., Away3D), such that the user at the client does not need to download any additional software to run the 3D model.

At 904, a 2D image is received. In various embodiments, the 2D image is the basis for the graphic design a user desires to apply to the asset. The 2D image may be generated, uploaded, and/or selected by the user and/or generated using a drawing tool. For example, the drawing tool can be built into a user interface associated with the game. In various embodiments, the 2D image may be uploaded (e.g., from Clip Art or from a local or remote drive), selected from among one or more available images (e.g., the images can be available at the user interface associated with the game), and/or further edited (e.g., enlarged, cropped, shrunk). The 2D image that is selected/generated/uploaded by the user is sometimes referred to herein as a "user-chosen 2D image."

At 906, the 3D model with the 2D image wrapped on it is rendered dynamically. In some embodiments, the 2D image can be treated as a UV texture map and wrapped to the 3D model. The "U" and "V" of a UV texture map describe the two dimensions of the 2D image (because "X," "Y," and "Z" are already used to describe the 3D model in space). A UV texture map allows polygons of a 3D model to be painted with patterns/colors from a 2D image. UV mapping includes mapping portions of the 2D image to the appropriate areas on the surface of the 3D model.

In some embodiments, the 2D image is positioned over various surface areas of the 3D model and the appearance of the 3D model wrapped with the 2D image is dynamically rendered and displayed for each placement of the 2D image. In some embodiments, the 2D image is positioned over a template associated with the surface area of the 3D model and a user can move the placement of the 2D image over the template (e.g., via a user interface) to customize a desired overlay/design/wrapping of the 2D image over the 3D model. For example, using a 3D engine and/or tool, the Flash Client renders the invisible 3D model with the texture wrapped to the model so that only the texture and/or other visual data (e.g., layers such as the base color, shading, and highlight) associated with the appropriate angle/perspective of the 3D model is displayed at the client device. In some embodiments, one or more 2D images can be generated based on various angles/perspectives of the 3D model with texture wrapped around them. As discussed further below, each of these generated 2D images (sometimes referred to as 2D graphic design images) can be used as a graphic design layer to be stacked with one or more of the base color, shading, and highlight layers to show an asset with the customized graphic design applied to it.

Figure 10:
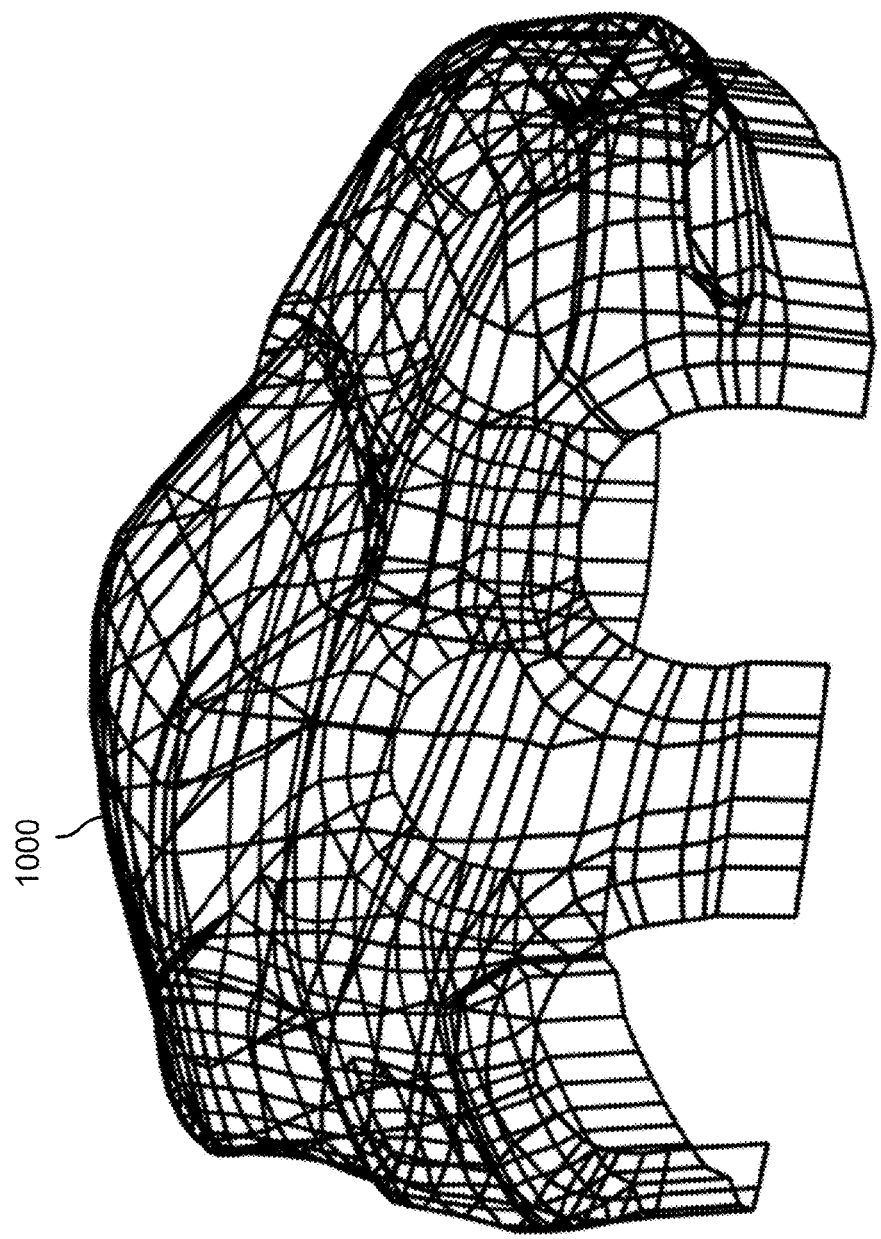
FIG. 10 is a diagram showing an example of a 3D model of an asset.

FIG. 10 is a diagram showing an example of a 3D model of an asset. The example shows a 3D model of the body of virtual car asset 300 of FIG. 3. As shown in the example, the outer skin/surface of 3D model 1000 comprises a plurality of polygon shapes arranged in three-dimensional space. In some embodiments, a 2D image chosen by a user can be mapped to a 3D model by assigning pixels in the 2D image to coordinates of the polygons of the 3D model. For example, this mapping can be achieved by programmatically copying a piece of the 2D image and pasting it onto a corresponding area of the surface of the 3D model.

Figure 11:
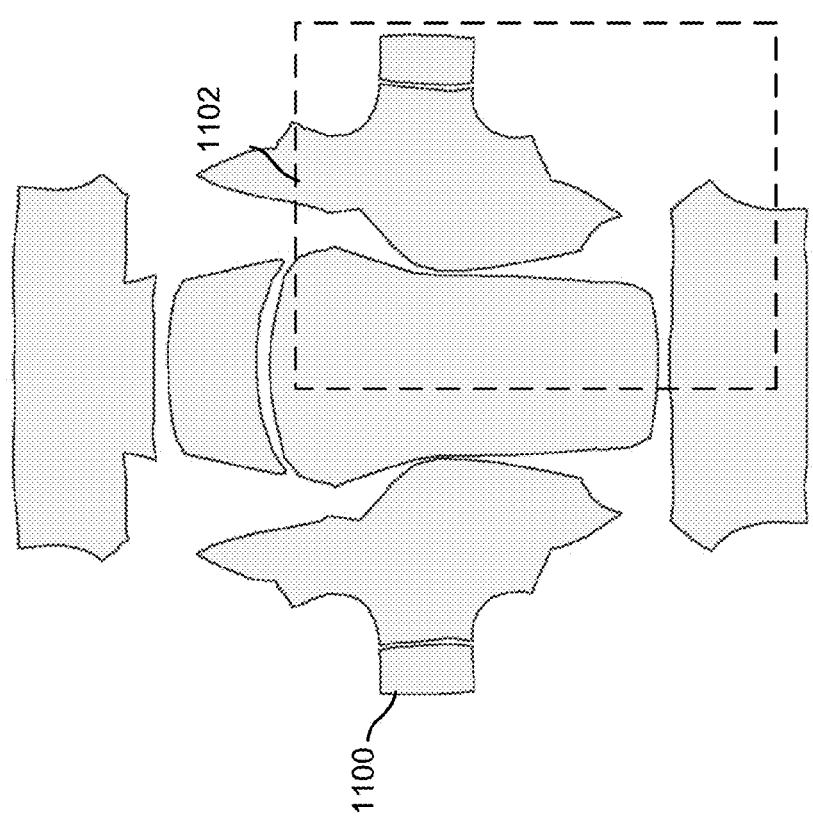
FIG. 11 is a diagram showing an example of a template of a 3D model of an asset.

FIG. 11 is a diagram showing an example of a template of a 3D model of an asset. In some embodiments, a template, such as template 1100 is optionally used for customizing a graphic design to be applied to an asset. In the example, template 1100 is associated with 3D model 1000. In the example, dashed box 1102 represents the outline of a 2D image that is chosen by a user. Template 1100 can appear at a user interface where a user can then drag the 2D image over the template at various locations/placements/positions of the template. Then, the portions of the 2D image that are located within the outlines of template 1100 are dynamically wrapped around 3D model 1000 at the corresponding areas on its surface and in some embodiments, displayed to the user at the client device. For example, as a user changes/drags the placement of the 2D image over template 1100, the wrapping of the 2D image over the 3D model is dynamically updated (and displayed) based on each changed placement of the 2D image over template 1100. In some embodiments, a temporary layer is generated using a placement of the 2D image wrapped over the 3D model and stacked together with other layers (e.g., over the base color layer but under the highlight and shading layers) such that the stacked layers are displayed to represent each changed placement of the 2D image over the 3D model. The portions of the 2D image that are not located within the outlines of template 1100 are ignored (e.g., not wrapped around the 3D model).

Figure 12:
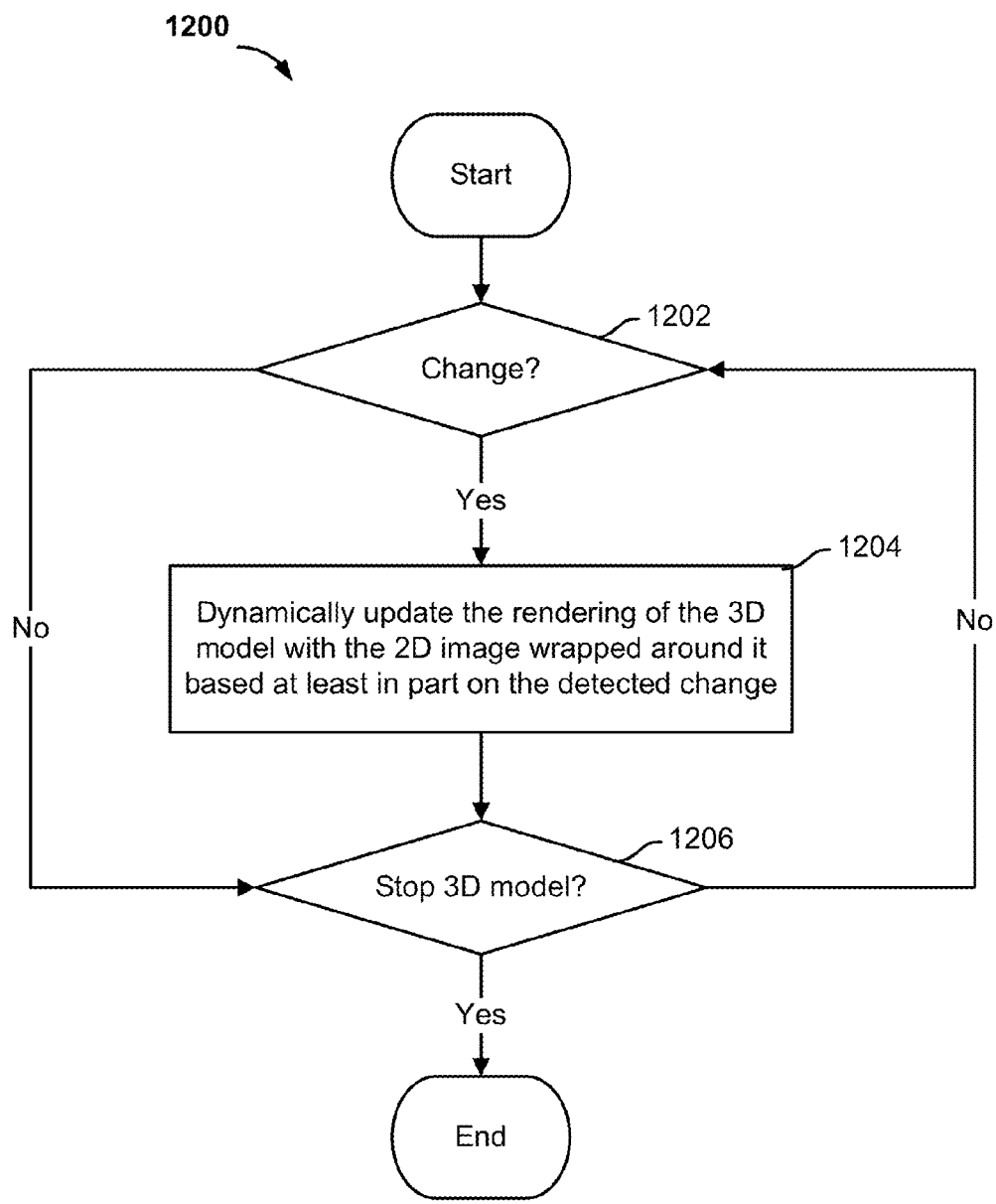
FIG. 12 is a flow diagram showing an example of updating the wrapping of a 2D image over the 3D model.

FIG. 12 is a flow diagram showing an example of updating the wrapping of a 2D image over the 3D model. In some embodiments, process 1200 is implemented at system 100. In some embodiments, process 1200 is used to implement 906 of process 900.

At 1202, it is determined whether the wrapping of the 2D image over the 3D model has changed. In some embodiments, when the 2D image changes in shape, size, orientation, and/or position of placement over a template (if a template such as template 1100 is used) from a previous position, then a change in the wrapping of the 2D image over the 3D model is detected. If such a change is detected, control then passes to 1204. Otherwise, control passes to 1206.

At 1204, the rendering of the 3D model with the 2D image wrapped around it is dynamically updated based at least in part on the detected change. In some embodiments, each change detected at 1202 entails remapping/rewrapping the 2D image (that is laid over the template) to the surface of the 3D model, based on, for example, the new shape, size, and/or position over the template of the 2D image. In some embodiments, subsequent to updating the rendering of the 3D model, the updated 3D model is displayed at the user interface with the changed 2D image wrapped around it.

At 1206, it is determined whether the 3D model is to be stopped. In some embodiments, process 1200 is repeated continuously from 1202 until a condition is met, in which the 3D model is prevented from running at the client device. For example, the condition can be that the system is shut down or that a particular user selection that is designated to stop the 3D model from running (e.g., the user selection can be associated with saving the customized asset) has been performed.

Figure 13:
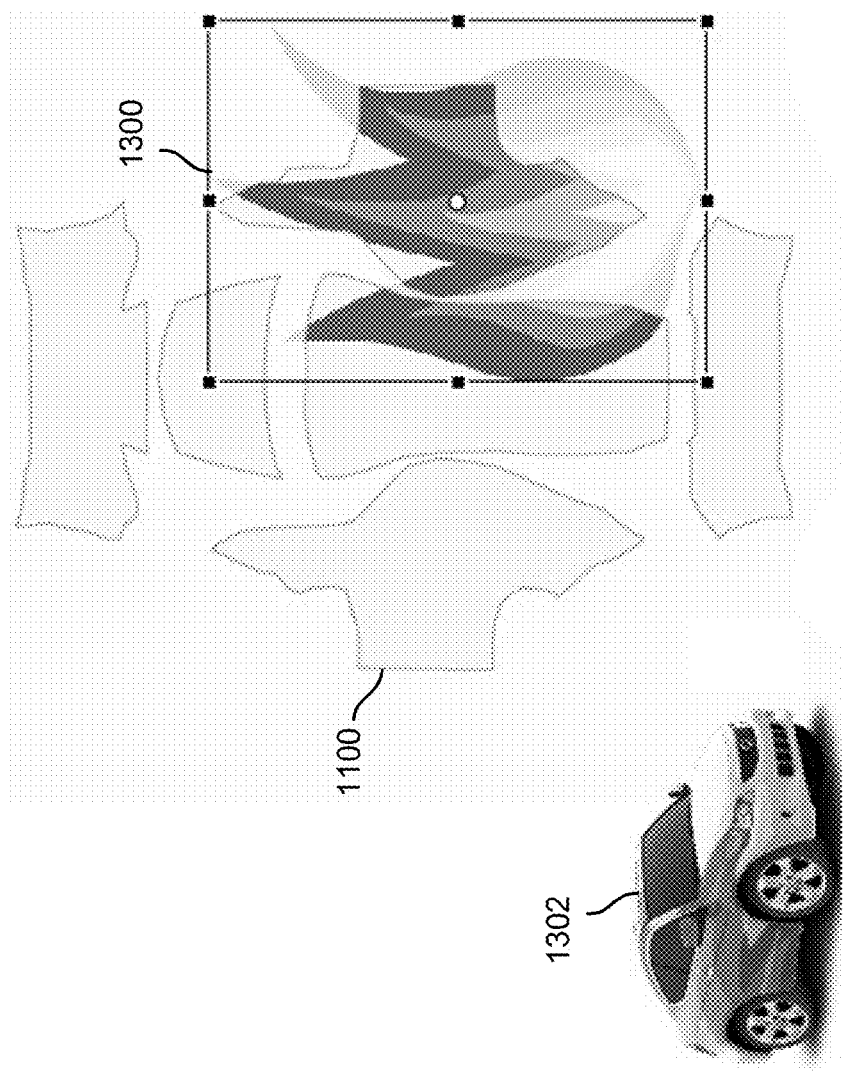
FIG. 13 is a diagram showing an example of a 3D model rendered with the 2D image wrapped over it.

FIG. 13 is a diagram showing an example of a 3D model rendered with the 2D image wrapped over it. The example of FIG. 13 can appear in a user interface that is used for customizing a texture associated with virtual car asset 300. In the example, flame image 1300 (a 2D image that is uploaded by a user) is laid over a portion of template 1100. Rendered 3D model wrapped with a 2D image 1302 is a 3D model that is dynamically updated to show the wrapping of the 2D image based on the current position of flame image 1300 over template 1100, as shown in FIG. 13. In the example, rendered 3D model wrapped with a 2D image 1302 appears as one angle/perspective (of one or more possible angles/perspectives) at which virtual car asset 300 can be seen (e.g., in game play). Rendered 3D model wrapped with a 2D image 1302 includes the texture of flame image 1300 mapped to the 3D model, as well as several stacked layers of image data (e.g., base color layer and shading layer, associated with virtual car asset 300 at that particular angle/perspective). Because template 1100 is associated with only the body of virtual car asset 300, portions of flame image 1300 are not mapped to the non-body regions of virtual car asset 300, such as the windows, wheels, rims, grille, lights, etc. Rendered 3D model wrapped with a 2D image 1302 can help a user who wishes to add a graphic design to the virtual car asset to determine what the 3D rendering of a certain position/orientation/appearance of the 2D image will look like once applied/mapped to the 3D model that represents the virtual car asset. The portions of flame image 1300 that are included within the outlines of template 1100 that are wrapped on the rendered 3D model appear in darker colors. The portions of flame image 1300 not included within the outlines of template 1100 and thus are not wrapped on the rendered 3D model appear in lighter colors. In some embodiments, flame image 1300 can also be edited (e.g., enlarged, shrunk, cropped, stretched, rotated, flipped, etc.) by a user at the user interface and such a change can be dynamically updated in the rendered 3D model. As shown in the next figure, flame image 1300 can be dragged (e.g., by a user's selection at the user interface) over a different region of template 1100 to create a different wrapping over the 3D model, and such change can be dynamically updated in the rendered 3D model.

Figure 14:
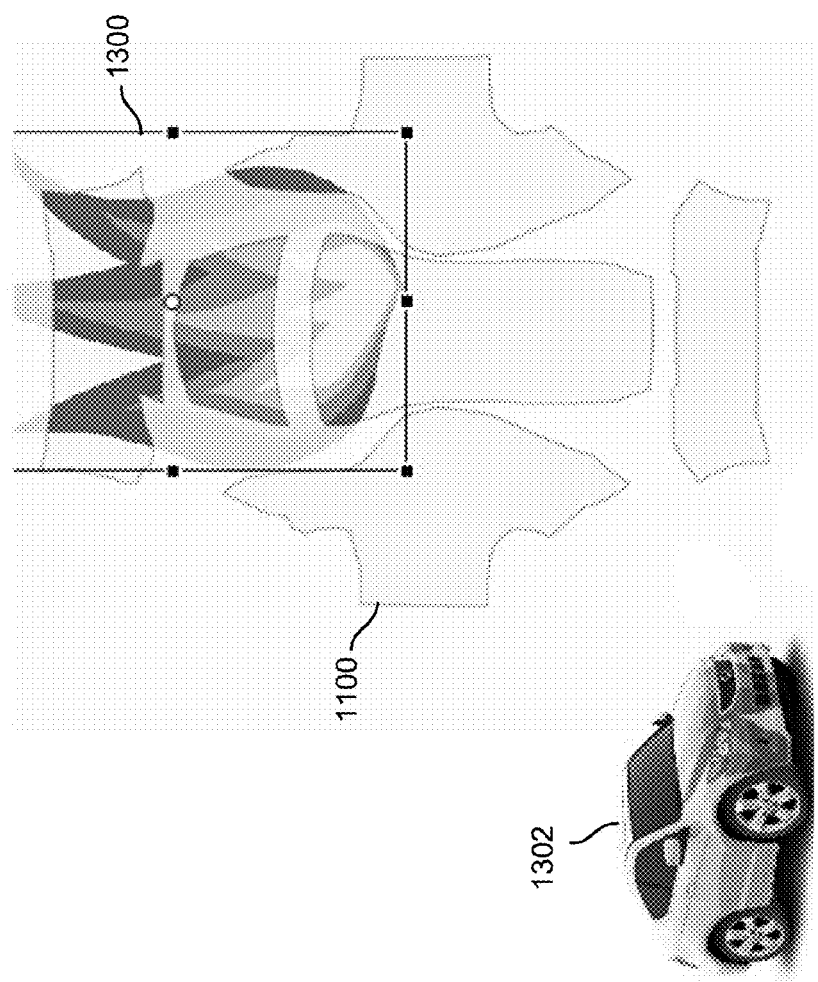
FIG. 14 is a diagram showing another example of a 3D model rendered with the 2D image wrapped over it.

FIG. 14 is a diagram showing another example of a 3D model rendered with the 2D image wrapped over it. In the example of FIG. 14, the placement of flame image 1300 has been moved (e.g., by a user at a user interface) from its previous position in FIG. 13 to the current position over template 1100, as shown in FIG. 14. This change in the position of flame image 1300 over template 1100 can be detected using a process such as process 1200 and in response to detection of such a change, the mapping of flame image 1300 is dynamically updated on rendered 3D model wrapped with a 2D image 1302. In the example of FIG. 14, the rendered 3D model wrapped with a 2D image 1302 has now been updated with the current position of flame image 1300 over template 1100, as shown in FIG. 14.

Figure 15:
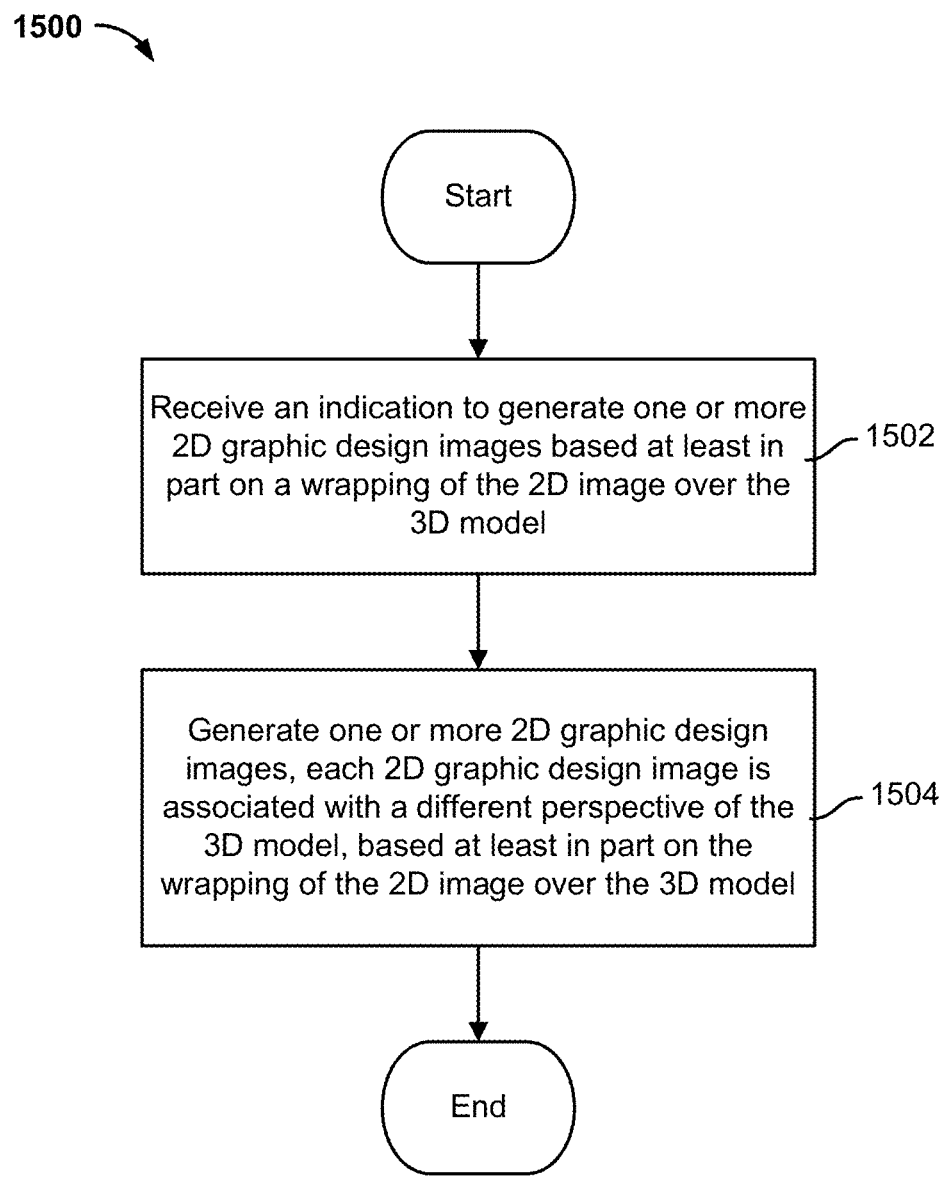
FIG. 15 is a flow diagram showing an embodiment of a process for generating one or more 2D images from wrapping the texture map onto a 3D model.

FIG. 15 is a flow diagram showing an embodiment of a process for generating one or more 2D images from wrapping the texture map onto a 3D model. In some embodiments, process 1500 is implemented at system 100.

At 1502, an indication to generate one or more 2D graphic design images based at least in part on a wrapping of the 2D image over the 3D is received. In some embodiments, such an indication is associated with a performance of a specially-designated user selection at the user interface. For example, the user selection can be a user clicking "Buy" with respect to the customized wrapping of the user-chosen 2D image over the virtual car asset (which also indicates the completion of the customization process). In some embodiments, this same designated user selection is also used to cue stopping the 3D model at the client device of 1206 of process 1200.

At 1504, one or more 2D graphic design images based at least in part on the wrapping of the 2D image over the 3D model is generated, each 2D graphic design image being associated with a different perspective of the 3D model. For example, once the indication is received, the wrapping of the user-chosen 2D image over the invisible 3D model can no longer be further updated and the most recently updated wrapping of the user-chosen 2D image over the 3D model is used to generate the one or more 2D graphic design images. In some embodiments, the 3D model with the final wrapping of the user-chosen 2D image is rotated and oriented to match one or more predetermined angles/perspectives of the 2D asset and a 2D graphic design image is generated for each angle/perspective of the 2D asset. For example, the Flash Client can iterate through all predetermined angles/perspectives associated with the asset (e.g., used in the game in which the asset is to be used), and generate a 2D bitmap for each of those angles/perspectives and save them (e.g., to the clients and/or server). In some embodiments, six angles/perspectives are used and so six 2D graphic design images are generated. In some embodiments, each generated 2D graphic design image is used as a graphic design layer that can be inserted over the base color layer and under the shading and highlight layers to create the appearance that the customized graphic design is applied to the asset (all other layers used in the combination are associated with the same angle/perspective as the graphic design layer). In some embodiments, once the one or more 2D graphic design images are generated, the 3D model is prevented from running at the client device.

In various embodiments, once 2D graphic design images are generated and stored, each time a user views that customized virtual asset (e.g., associated with playing the interactive game), the saved graphic design associated with the appropriate angle/perspective is loaded in and used (e.g., rather than loading in the 3D model and re-wrapping the user-chosen 2D image to it). In various embodiments, 2D graphic design images are stored and used locally, in addition to and/or instead of saving them to a server. During game play (or other interaction, in the case of virtual environments other than games), an appropriate one of the previously generated 2D graphic design images is used to display the asset in the context of the virtual game environment. For example, in some embodiments, game application code includes code and/or values used during game play to select one of the available views of the asset to be displayed based on such factors as the state of game play, a location of the asset within the game or other virtual environment, a direction or other input received from the user, the location and attributes of adjacent virtual assets and/or elements of the virtual environment, etc. In this way, the appearance and sense of using a 3D asset to interact with a 3D virtual environment is provided to the user using computationally and bandwidth efficient 2D images each showing the asset as viewed from an associated angle/perspective.

Figure 16B:
FIG. 16B is a diagram showing an example of the 2D image generated by wrapping the user-chosen 2D image onto the invisible 3D model and rotating and orienting the 3D model to match one perspective of the 2D virtual car asset.
Figure 16A:
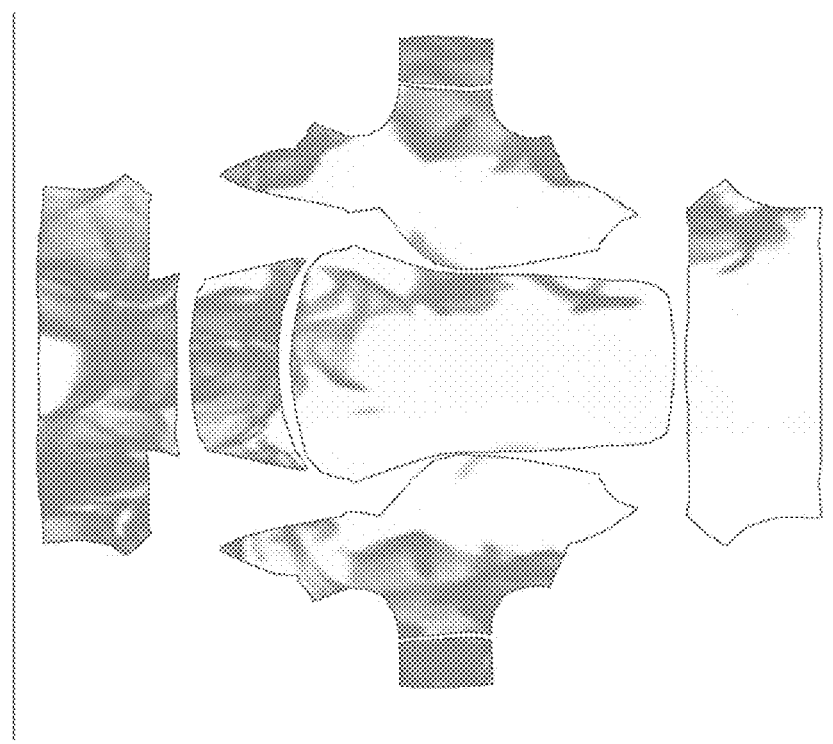
FIG. 16A is a diagram showing an example of a template filled in with a user-chosen 2D image.

FIG. 16A is a diagram showing an example of a template filled in with a user-chosen 2D image. In the example, a template such as template 1100 has been filled in, within its outlines, with a 2D image of swirl patterns that was chosen by a user. In some embodiments, once a condition to trigger the stopping of the 3D model is met (e.g., 1206 of process 1200), the template is filled in, within its outlines, with the design of the 2D image based on the last position when the user-chosen 2D image was laid over the template. The image data of the filled in template FIG. 16A is then wrapped over the appropriate surface areas of the 3D model.

FIG. 16B is a diagram showing an example of the 2D image generated by wrapping the user-chosen 2D image onto the invisible 3D model and rotating and orienting the 3D model to match one perspective of the 2D virtual car asset. The 2D graphic design image of the example can be used as a graphic design layer and inserted above the base color layer and below the shading and highlight layers, where the base color, shading, and highlight layers are each associated with the same angle/perspective of the virtual car asset that is associated with the graphic design image.

Figure 17:
FIG. 17 shows an example of a final virtual car asset with a customized graphic design layer applied to it.

FIG. 17 shows an example of a final virtual car asset with a customized graphic design layer applied to it. The example shows an angle/perspective of virtual car asset 300 with the application of the graphic design layer of FIG. 16B inserted above the base color layer and below the shading and highlight layers, in addition to other layers associated with windows, wheels, rims, grille, and head/tail lights of the asset.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of customizing a virtual asset, comprising:
at a computer system comprising a memory and a processor:
receiving a virtual asset that includes a first color layer, wherein the first color layer is set to an initial color value;
enabling the initial color value of the first color layer to be changed by a user to a final color value, wherein the final color value is different than the initial color value;
duplicating the first color layer into a plurality of color layers that are identical to the first color layer, wherein the plurality of color layers includes a shading layer and a highlighting layer and wherein the shading layer and the highlighting layer are set to the final color value,
processing the shading layer, wherein the processing comprises adjusting, without human intervention, responsive to the duplication, and independent of color values in the plurality of color layers other than the shading layer, a hue of a red component of the final color value to a maximum lightness in the shading layer;
processing the highlighting layer, wherein the processing comprises adjusting, without human intervention, responsive to the duplication, and independent of color values in the plurality of color layers other than the highlighting layer, a hue of a red component of the final color value to a minimum lightness in the highlighting layer; and
stacking the plurality of layers on top of the first color layer, wherein the stacking comprises multiplying corresponding portions of the shading layer and the first color layer against each other, thereby customizing the virtual asset.

2. The method of claim 1, wherein the final color value represents a solid color.

3. The method of claim 1, wherein the virtual asset comprises a SWF file and the first color layer and the plurality of layers are respective layers within the SWF file.

4. The method of claim 1, wherein the virtual asset is received at a client device.

5. The method of claim 1, wherein the virtual asset is two-dimensional and is rendered to appear three-dimensional by copying portions of a two-dimensional model onto a plurality of polygons on a surface of a three-dimensional model.

6. The method of claim 1, wherein the first color layer is bitmap data marked for coloring by including shading, highlight, and base color information.

7. The method of claim 1, wherein the stacking results in the highlight layer being stacked on top of the shading layer, and the shading layer being stacked on top of the first color layer.

8. The method of claim 1, wherein the stacking results in the shading layer being stacked on top of the highlighting layer, and the highlighting layer being stacked on top of the first color layer.

9. A computer program product for customizing a virtual asset, the computer program product being embodied in a non-transitory computer readable storage medium and comprising computer instructions, comprising:
receiving a virtual asset that includes a first color layer, wherein the first color layer is set to an initial color value;
enabling the initial color value of the first color layer to be changed by a user to a final color value, wherein the final color value is different than the initial color value;
duplicating the first color layer into a plurality of color layers that are identical to the first color layer, wherein the plurality of color layers includes a shading layer and a highlighting layer and wherein the shading layer and the highlighting layer are set to the final color value,
processing the shading layer, wherein the processing comprises adjusting, without human intervention, responsive to the duplication, and independent of color values in the plurality of color layers other than the shading layer, a hue of a red component of the final color value to a maximum lightness in the shading layer;
processing the highlighting layer, wherein the processing comprises adjusting, without human intervention, responsive to the duplication, and independent of color values in the plurality of color layers other than the highlighting layer, a hue of a red component of the final color value to a minimum lightness in the highlighting layer; and
stacking the plurality of layers on top of the first color layer, wherein the stacking comprises multiplying corresponding portions of the shading layer and the first color layer against each other, thereby customizing the virtual asset.

10. The computer program product of claim 9, wherein the virtual asset is received at a client device.

11. The computer program product of claim 9, wherein the virtual asset is two-dimensional and is rendered to appear three-dimensional by copying portions of a two-dimensional model onto a plurality of polygons on a surface of a three-dimensional model.

12. The computer program product of claim 9, wherein the first color layer is bitmap data marked for coloring by including shading, highlight, and base color information.

13. The computer program product of claim 9, wherein the stacking results in the highlight layer being stacked on top of the shading layer, and the shading layer being stacked on top of the first color layer.

14. The computer program product of claim 9, wherein the stacking results in the shading layer being stacked on top of the highlighting layer, and the highlighting layer being stacked on top of the first color layer.

15. A system for customizing a virtual asset, comprising:
a memory and a processor, wherein the memory comprises one or more programs that are collectively configured to use the processor to:
receive a virtual asset that includes a first color layer, wherein the first color layer is set to an initial color value:
enable the initial color value of the first color layer to be changed by a user to a final color value, wherein the final color value is different than the initial color value;
duplicate the first color layer into a plurality of color layers that are identical to the first color layer, wherein the plurality of color layers includes a shading layer and a highlighting layer and wherein the shading layer and the highlighting layer are set to the final color value,
process the shading layer by adjusting, without human intervention, responsive to the duplication, and independent of color values in the plurality of color layers other than the shading layer, a hue of a red component of the final color value to a maximum lightness in the shading layer;
process the highlighting layer by adjusting, without human intervention, responsive to the duplication, and independent of color values in the plurality of color layers other than the highlighting layer, a hue of a red component of the final color value to a minimum lightness in the highlighting layer; and
stacking the plurality of layers on top of the first color layer, wherein the stacking comprises multiplying corresponding portions of the shading layer and the first color layer against each other, thereby customizing the virtual asset.

16. The system of claim 15, wherein the final color value represents a solid color.

17. The system of claim 15, wherein the one or more programs are further collectively configured to display the plurality of layers stacked on the first color layer.

18. The system of claim 15, wherein the virtual asset comprises a SWF file and the first color layer and the plurality of layers are respective layers within the SWF file.

19. The system of claim 15, wherein the virtual asset is received at a client device.

20. The system of claim 15, wherein the virtual asset is two-dimensional and is rendered to appear three-dimensional by copying portions of a two-dimensional model onto a plurality of polygons on a surface of a three-dimensional model.

21. The system of claim 15, wherein the first color layer is bitmap data marked for coloring by including shading, highlight, and base color information.

22. The system of claim 15, wherein the stacking results in the highlight layer being stacked on top of the shading layer, and the shading layer being stacked on top of the first color layer.

23. The system of claim 15, wherein the stacking results in the shading layer being stacked on top of the highlighting layer, and the highlighting layer being stacked on top of the first color layer.

* * * * *